United States Patent
Keegan (10) Patent No.: US 8,942,157 B2
(45) Date of Patent: Jan. 27, 2015

(54) RECEIVER AND METHOD FOR RECEIVING A COMPOSITE SIGNAL

(71) Applicant: Deere & Company, Moline, IL (US)

(72) Inventor: Richard G. Keegan, Palos Verdes Estates, CA (US)

(73) Assignee: Deere & Company, Moline, IL (US)

( * ) Notice: Subject to any disclaimer, the term of this patent is extended or adjusted under 35 U.S.C. 154(b) by 121 days.

(21) Appl. No.: 13/718,756

(22) Filed: Dec. 18, 2012

(65) Prior Publication Data

US 2014/0119392 A1    May 1, 2014

Related U.S. Application Data (60) Provisional application No. 61/718,947, filed on Oct. 28, 2012.

(51) Int. Cl.
| | | |
|---|---|---|
| H04W 4/00 | (2009.01) | |
| G01S 19/30 | (2010.01) | |
| H04B 1/69 | (2011.01) | |
| H04L 27/00 | (2006.01) | |

(52) U.S. Cl.
CPC . *G01S 19/30* (2013.01); *H04B 1/69* (2013.01); *H04L 27/00* (2013.01)
USPC ............................ 370/313; 370/315; 370/546

(58) Field of Classification Search
CPC ............. H04K 3/44; H04K 3/90; H04L 5/143
USPC ........................................... 370/313.315, 546
See application file for complete search history.

(56) References Cited

U.S. PATENT DOCUMENTS

| | | | |
|---|---|---|---|
| 3,922,496 A | 11/1975 | Gabbard et al. | |
| 4,914,735 A | 4/1990 | Ichiyoshi | |

(Continued)

FOREIGN PATENT DOCUMENTS

| | | | |
|---|---|---|---|
| EP | 1672384 A2 | 6/2006 | |
| EP | 1664827 B1 | 8/2007 | |

(Continued)

OTHER PUBLICATIONS

Lohan, Elena Simona; Renfors, Markku; Correlation properties of Multiplexed Binary Offset Carrier (MBOC) modulation Institute of Communications Engineering, Tampere University of Technology. FIN-33101. Finland.

(Continued)

*Primary Examiner* — Ricky Ngo
*Assistant Examiner* — Dewanda Samuel (57) ABSTRACT

A first signal generator is arranged to generate a first signal. A ranging code generator is arranged for generating a ranging code. A mixer is capable of accepting the ranging code and the first signal and outputting a locally generated reference signal. After down-conversion and digitization of the received composite signal, the code correlator can correlate the digital received composite signal to the locally generated reference signal to decode at least a first portion of the received composite signal, while leaving a second portion of the received composite signal undecoded. A tracking loop signal processor can process one or more digital signals, of the locally generated reference signal with respect to the digital received composite signal to maximize correlation of the received composite signal to the locally generated reference signal.

20 Claims, 4 Drawing Sheets

(56) References Cited

U.S. PATENT DOCUMENTS

| | | | |
|---|---|---|---|
| 5,729,570 A | 3/1998 | Magill | |
| 6,097,762 A | 8/2000 | Suzuki et al. | |
| 6,359,504 B1 | 3/2002 | Cozzarelli | |
| 6,922,167 B2* | 7/2005 | Gerein | 342/357.74 |
| 7,043,271 B1 | 5/2006 | Seto et al. | |
| 7,120,198 B1 | 10/2006 | Dafesh et al. | |
| 7,164,696 B2 | 1/2007 | Sano et al. | |
| 7,346,918 B2 | 3/2008 | Hennenhoefer et al. | |
| 7,418,043 B2 | 8/2008 | Shattil | |
| 7,471,241 B1* | 12/2008 | Yang | 342/357.73 |
| 8,111,735 B2* | 2/2012 | Chen | 375/150 |
| 8,233,518 B2* | 7/2012 | Pratt et al. | 375/146 |
| 8,369,464 B2* | 2/2013 | Mattos | 375/343 |
| 8,374,223 B2* | 2/2013 | Chen et al. | 375/150 |
| 8,416,839 B2* | 4/2013 | Issler et al. | 375/150 |
| 8,509,286 B2* | 8/2013 | Hodgart | 375/147 |
| 2003/0231580 A1* | 12/2003 | Martin et al. | 370/203 |
| 2004/0165652 A1 | 8/2004 | Schilling et al. | |
| 2005/0281325 A1* | 12/2005 | Lillo et al. | 375/150 |
| 2007/0176676 A1 | 8/2007 | Pratt et al. | |
| 2007/0195867 A1* | 8/2007 | Betz et al. | 375/152 |
| 2008/0260001 A1 | 10/2008 | Betz et al. | |
| 2009/0046766 A1* | 2/2009 | Avellone et al. | 375/142 |
| 2010/0284440 A1 | 11/2010 | Betz et al. | |

FOREIGN PATENT DOCUMENTS

| | | |
|---|---|---|
| EP | 1830199 B1 | 2/2012 |
| GB | 2456867 B | 10/2011 |
| JP | 008130563 A | 5/1996 |
| JP | 2008032737 A | 2/2006 |
| JP | 2007504731 A | 10/2007 |
| WO | 2005011131 A2 | 2/2005 |

OTHER PUBLICATIONS

Slimane, S. Ben; Le-Ngoc, T.; Bandwidth Efficient Differential Phase Shift Keying (PSK) Techniques for TDMA Applications. Concordia University Electrical and Computer Engineering Department. Montreal, Quebec, Canada.

Dovis, Fabio; Presti, Letizia Lo; Fantino, Maurizio: Mulassano, Paolo: Godet, Jeremie; Comparison between Galileo CBOC Candidates and BOC (1.1) in Terms of Detection Performance, International Journal of Navigation and Observation, vol. 2008, Article ID 793868.

Pratt, Anthony R.: Owen, John I.R.; Hein Guenter W.; Avila-Rodriguez, Jose A.; Tracking Complex Modulation Waveforms—How to Avoid Receiver Bias. Ively Road. Farnborough. GU 14 OLA, United Kingdom. University FAF Munich, Werner-Heisenberg-Weg 39, Neubiberg, 85577, Germany.

Pratt, Anthony R.; Owen, John I.R.; Hein Guenter W.; Avila-Rodriguez, Jose A., Controlling the Galileo L1 OS Signal Emissions with satellite Baseband Filters. Ively Road, Farnborough, GU 14 OLA, United Kingdom.

Hein, Guenter W.; Avila-Rodriguez, Jose-Angel; Wallner, Stefan: Pratt, Anthony R.; Owen, John; Issler, Jean-Luc; Betz, John W.; Hegarty, Chris J.; Lenahan, Lt Sean; Rushanan, Joseph J.; Kraay, Andrea L.; Stansell, Thomas A.; MBOC: The New Optimized Spreading Modulation Recommended for GALILEO L1 OS and GPS L1C. 2006.

Soellner, M., Erhard, PH.; Comparison of AWGN Code Tracking Accuracy for Alternative-BOC, Complex-LOC and Complex-BOC Modulation Options in Galileo E5-Band. System-Engineer Navigation, Astrium Germany. Ottobrunn. European Space Agency.

Stansell, Tom: Fenton, Pat; Gann, Lionel; Hatch, Ron: Knight, Jerry, Rowitch, Doug; Sheynblat, Len; Stratton, Alex; Studenny, John; Weill, Larry; BOC or MBOC? The Common GPS/Galileo Civil Signal Design: A Manufacturers Dialog. Part 1. 2006, InsideGNSS, Jul./Aug. 2006.

Global Positioning System Directorate Systems Engineering & Integration Interface Specification IS-GSP-800, Navstar GPS Space Segment/User Segment L1C Interface, publication IS-GPS-800, dated Sep. 21, 2011, available on-line at http://www.gps.gov/technical/icwg/#is-gps-800.

* cited by examiner

RECEIVER AND METHOD FOR RECEIVING A COMPOSITE SIGNAL

This document (including the drawings) claims priority and the benefit of the filing date based on U.S. provisional application No. 61/718,947, filed Oct. 26, 2012 under 35 U.S.C. §119 (e), where the provisional application is hereby incorporated by reference herein.

FIELD OF THE DISCLOSURE

This disclosure relates to a receiver and method for receiving a composite signal.

BACKGROUND

A transmitter of a navigation satellite might transmit a composite signal such as a multiplexed binary offset carrier signal. In certain prior art, a complex receiver may be required to decode fully the composite signal or multiplexed binary offset carrier signal. For example, the receiver may need knowledge of: (1) the carrier frequency or suppressed carrier frequency of each binary offset carrier component and (2) the modulation scheme to form a local replica of the multiplexed binary offset carrier signal at the receiver. Thus, there is a need for a simpler receiver that uses less circuitry, consumes less energy, or is less expensive than that required for decoding fully the composite signal or the multiplexed binary offset signal.

SUMMARY

In accordance with one embodiment, a receiver for receiving a composite signal is capable of at least partially decoding a received composite signal. A receiver front-end is configured for down-converting the received composite signal. An analog-to-digital converter is capable of converting the down-converted composite signal to a digital received composite signal. A first signal generator is arranged to generate a first signal. A ranging code generator is arranged for generating a ranging code. A mixer is capable of accepting the ranging code and the first signal and outputting a locally generated reference signal. A code correlator can correlate the digital received composite signal to the locally generated reference signal to decode at least a first portion of the received composite signal, while leaving a second portion of the received composite signal undecoded. A tracking loop signal processor can process (e.g., shift an adjustable time delay of) one or more digital signals associated with the locally generated reference signal with respect to the digital received composite signal to maximize correlation of the received composite signal to the locally generated reference signal.

DESCRIPTION OF ILLUSTRATIVE EMBODIMENT(S)

Figure 1:
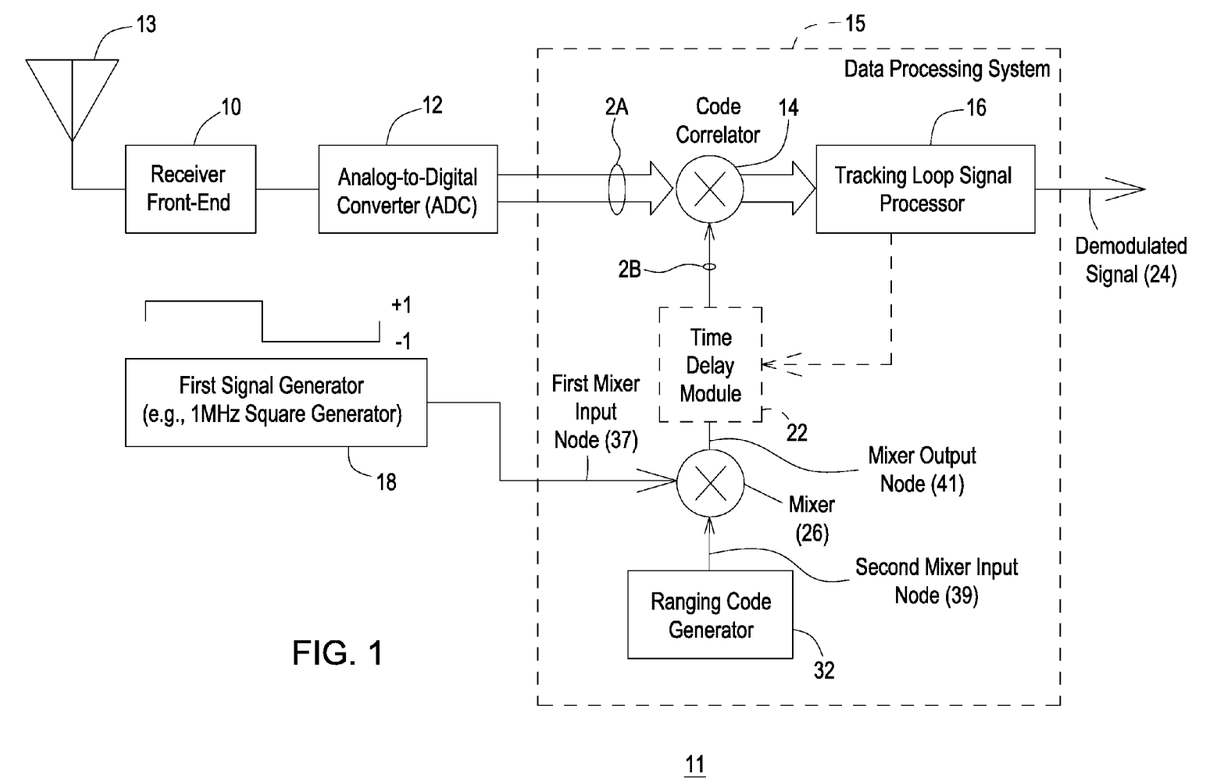
FIG. 1 is a block diagram of one embodiment of a receiver for receiving a composite signal (e.g., multiplexed binary offset carrier signal).

In accordance with one embodiment, FIG. 1 shows a receiver 11 for receiving a composite signal (e.g., a multiplexed binary offset carrier signal or pilot component of the L1C signal for the Global Positioning System (GPS)) that is capable of at least partially decoding the received composite signal that is received at antenna 13. In one embodiment, the received composite signal is transmitted from a satellite, such as a navigation satellite, or such as a Galileo-compatible navigation satellite or Global Positioning System satellite. In one embodiment, the received composite signal refers to a first binary offset carrier signal that is multiplexed with a second binary offset carrier signal, where the first binary offset carrier signal comprises a first modulating subcarrier signal ($f_m$) (e.g., a square wave, sine wave, or cosine wave) multiplied by a secondary modulating signal or a ranging code signal ($f_n$) (e.g. pseudo-random noise ranging signal or pseudo-noise signal) that is equal to or greater than a chip rate of spread spectrum signal. Similarly, the second binary offset carrier signal comprises a second modulating subcarrier signal ($f_o$) (e.g., a square wave, sine wave, or cosine wave) multiplied by the secondary modulating signal or the ranging code signal ($f_p$) (e.g., where $f_n$ is set equal to $f_p$).

As used in this document, a binary offset carrier (BOC) signal may comprise a sine BOC signal (sin BOC), a cosine BOC signal (cosBOC), multiplexed binary offset carrier (MBOC), a time-division multiplexed BOC signal, an alternative BOC signal, a double BOC signal, a composite binary offset carrier signal, an L1C signal of a GPS system, or other variants. Certain BOC signals (e.g., BOC or sinBOC) can be represented as BOC (m,n) where m is $f_m/f_c$ and n is $f_n/f_c$, $f_m$ is a first subcarrier frequency, $f_n$ is the actual chip frequency, and $f_c$ is the reference chip frequency. Similarly, BOC signals (e.g., BOC or sinBOC) can be represented as BOC (o,p) where o is $f_o/f_c$ and p is $f_p/f_c$, $f_o$ is a first subcarrier frequency, $f_p$ is the actual chip frequency, and $f_c$ is the reference chip frequency. In one example, $f_c$ may be set to 1.023 MegaHertz (MHZ) or the reference course acquisition code (C/A code) reference signal of the GPS system.

The power spectral density of an illustrative square-wave modulated MBOC signal may be represented by the following equation:

$$G_{MBOC}\left(o, p, \frac{z}{y}\right)(f) = \frac{x}{y} G_{BOC(m,n)}(f) + \frac{z}{y} G_{BOC(o,p)}(f),$$

where
x is an integer greater than z, y is an integer and common denominator, the indices m, n, o and p are defined above, In one example, x/y approximately equals 10/11 and z/y approximately equals 1/11, such that a majority of the power spectral density is associated with the lower frequency $G_{BOC(m,n)}$ component, rather than the higher frequency $G_{BOC(o,p)}$ component.

The power spectral density of an illustrative square-wave modulated (6,1,z/y) MBOC signal may be represented by the following equation:

$$G_{MBOC}\left(6, 1, \frac{z}{y}\right)(f) = \frac{x}{y}G_{BOC(1,1)}(f) + \frac{z}{y}G_{BOC(6,1)}(f),$$

where
x is an integer greater than z, y is an integer and common denominator, the indices m, n, o and p are defined above, In one example, x/y approximately equals 10/11 and z/y approximately equals 1/11, such that a majority of the power spectral density is associated with the lower frequency $G_{BOC(1,1)}$ component, rather than the higher frequency $G_{BOC(6,1)}$ component.

For a sine-wave modulated MOBC signal, the power spectral density of an illustrative MBOC signal may be represented by the following equations:

$$G_{MBOC}\left(6, 1, \frac{x}{y}\right)(f) = \frac{x}{y}G_{SinBOC(1,1)}(f) + \frac{z}{y}G_{SinBOC(6,1)}(f),$$

where $$G_{SinBOC(m,n)}(f) = \frac{1}{T_c}\left(\frac{\sin\left(\pi f \frac{T_C}{N_B}\right)\sin(\pi f T_C)}{\pi \cos\left(\pi f \frac{T_C}{N_B}\right)}\right)^2,$$

where
x is an integer greater than z, y is an integer and common denominator, the indices m, n are defined above, $N_B$ is the BOC modulation index or $N_B$ equals 2 m/n, and $T_c$ is the actual chip rate (e.g., of the second subcarrier signal). In one example, x/y approximately equals 10/11 and z/y approximately equals 1/11, such that a majority of the power spectral density is associated with the lower frequency $G_{SinBOC(1,1)}$ component, rather than the higher frequency $G_{SinBOC(6,1)}$ component.

In one embodiment, a receiver front end 10 is coupled to an analog-to-digital converter 12. In turn, the analog-to-digital converter 12 communicates with a code correlator 14. A first signal generator 18 and a ranging code generator 32 are coupled to a mixer 26. In turn, the mixer 26 is coupled to the code correlator 14, either directly or indirectly, via an optional time delay module 22. The time delay module 22 is shown in dashed lines because it is optional and may be deleted if the tracking loop signal processor 16 and code correlator 14 are configured to obviate the need for the time delay module 22. The code correlator 14 communicates with a tracking loop signal processor 16 or tracking look signal processing system. If the time delay module 22 is used, the code correlator 14 is capable of communicating with (or controlling) the time delay module 22.

A receiver front-end 10 is coupled to an antenna 13 for receiving a composite signal (i.e., received composite signal), a microwave signal, a radio frequency signal, or another electromagnetic signal, such as a spread-spectrum signal or a code division multiple access signal transmitted by a navigation satellite. A receiver front-end 10 is configured for downconverting a received composite signal to a baseband signal or an intermediate frequency signal. An analog-to-digital converter 12 is capable of converting the down-converted signal (e.g., analog baseband signal or analog intermediate frequency signal) to a digital composite signal. A first signal generator 18 is arranged to generate a first signal at the first mixer input node 37.

A ranging code generator 32 is arranged for generating a ranging code at the second mixer input node 39. A mixer 26 is capable of accepting the ranging code and the first signal and outputting a locally generated reference signal at a mixer output node 41. A code correlator 14 can correlate the digital received composite signal to the locally generated reference signal to decode at least a first portion of the received composite signal, while leaving a second portion of the received composite signal undecoded.

A tracking loop signal processor 16 is arranged for processing the locally generated reference signal with respect to the digital received composite signal to maximize correlation of the received composite signal to the locally generated reference signal. For example, a tracking loop signal processor 16 can shift an adjustable time delay, or engage in other data processing of one or more digital signals associated with the locally generated reference signal with respect to the digital received composite signal to maximize correlation of the received composite signal to the locally generated reference signal. For example, a tracking loop signal processor 16 can shift an adjustable time delay, or engage in other data processing of one or more digital signals associated with the locally generated reference signal with respect to the digital received composite signal (e.g., direct path signal transmitted by a satellite or one or more multipath signals resulting from a satellite transmission) via the time delay module 22 to maximize correlation of the received composite signal to the locally generated reference signal.

In one embodiment, the optional time delay module 22 is arranged for shifting an adjustable time delay of the locally generated reference signal with respect to the digital received composite signal in response to the tracking loop signal processor 16 based on maximizing correlation of the received composite signal to the locally generated reference signal.

In one embodiment, the tracking loop signal processing processor 16 outputs a demodulated signal 24, such as a demodulated digital signal with a quadrature phase component and in-phase component at baseband.

In another configuration, the demodulated signal 24 may comprise a demodulated pilot component of an L1C carrier signal of a GPS-compliant satellite transmission. The demodulated pilot component may be a preliminary step in decoding a related data component that modulates the composite signal, for example. Alternatively, the demodulated pilot component may be a preliminary step in detecting a carrier phase or resolving a carrier phase ambiguity of the composite signal (e.g., L1C). The demodulated digital signal 24 (along with similar demodulated signals received from other satellites) may be used to estimate a position (e.g., geographic coordinates in two or three dimensions), velocity, or acceleration of the receiver, or the attitude (e.g., tilt angle, roll angle, or yaw angle (heading)) of the receiver.

In one embodiment, the receiver front end 10 may comprise one or more of the following elements: an amplifier or preamplifier coupled to the antenna 13, an amplifier or preamplifier for amplifying a received radio frequency or microwave signal that is transmitted by a navigation satellite transmitter, a local oscillator, a frequency adjustable local oscillator, an intermediate frequency amplifier, mixer, and a downconverter. For example, the downconverter may comprise the combination of a mixer and the local oscillator to multiply or mix the received composite signal at a transmitted frequency with a local oscillator at the transmitted frequency or lower frequency to downconvert the received composite signal to an analog intermediate frequency signal or an analog baseband signal.

In an alternate embodiment, the receiver front end 10 may have multiple down-converters in series or successive stages, where the first downconverter stage downconverts the received composite signal to an intermediate frequency analog signal and where the last stage downconverts the intermediate frequency analog signal to a baseband analog signal.

In one configuration, the analog-to-digital converter 12 is capable of converting the intermediate frequency analog signal or the baseband analog signal to a digital intermediate frequency signal or a digital baseband signal. The analog-to-digital converter 12 has sufficient processing throughput and adequate response times to provide real-time output of digital signals for processing by the receiver 11.

In one embodiment, a data processing system 15 comprises a combination of one or more of the following: the code correlator 14, the tracking loop signal processor 16, the optional time delay module 22, and the ranging code generator 32. The data processing system 15 may comprise hardware and software instructions. For example, in one illustrative embodiment the hardware comprises a data processor that communicates to a data storage device, which stores software instructions, via one or more data buses. The data processor may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device may comprise electronic memory, registers, shift registers, volatile electronic memory, a magnetic storage device, an optical storage device, or any other device for storing data.

The first signal generator 18 may comprise an oscillator circuit or a precision oscillator circuit that is capable of generating one or more of the following: a square wave, a sinusoidal wave, a rectangular waveform, a triangular waveform, a pulse train, bipolar phase shift keying, or another first signal. For example, in one embodiment the oscillator may comprise a phase locked loop circuit. In another embodiment, the oscillator circuit is associated with a highly stable and accurate clock signal to generate a first signal at a first frequency with precision and a maximum known tolerance or deviation from the first frequency.

In one embodiment, the ranging code generator 32 may comprise any generator for generating a spread spectrum code, spread spectrum sequence, binary sequences, Gold codes, pseudo-random noise code, a pseudo-random noise code sequence, or a pseudo-noise code that is similar to a spread spectrum code, spread spectrum sequence, binary sequences, Gold codes, pseudo-random noise code, pseudo-random noise code sequence, or a pseudo noise code transmitted by a transmitter of a satellite for reception by the receiver as the composite signal. In another embodiment, the ranging code generator 32 may be formed of series of shift registers that are loaded with an initial starting code sequence, where the shift registers have various selectable or controllable taps for providing feedback and reiterative values as the output.

The code correlator 14 correlates the digital received composite signal to the locally generated reference signal to decode at least a first portion of the received composite signal, while leaving a second portion of the received composite signal undecoded. The first portion of the received composite signal may comprise a first binary offset carrier signal component (e.g., BOC(1,1) component), whereas the second portion of the received composite signal may comprise a second binary offset carrier signal component (e.g., BOC (6,1)). In one example, the code correlator 14 does not demodulate the second binary offset carrier signal component (or second portion of the received composite signal) where the first binary offset carrier signal component (or first portion of the received composite signal) comprises the locally generated reference signal that is inputted into the code correlator 14. Accordingly, because the second binary offset carrier signal component or the second portion of the received composite signal is not fully demodulated, the receiver operates with some minimal or tolerable degradation (e.g., approximately 0.8 decibel (dB) degradation for certain configurations) in the signal-to-noise ratio of the received composite signal.

Figure 2A:
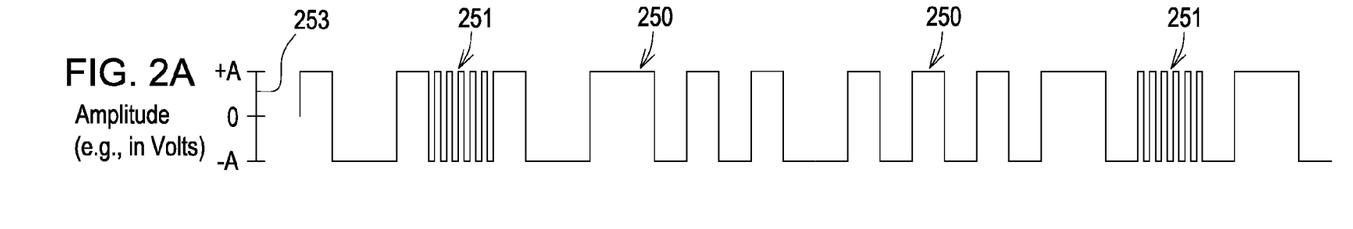
FIG. 2A is a diagram of an illustrative baseband representation of the received composite signal.

FIG. 2A illustrates one possible representation of the digital baseband composite signal, or its equivalent that modulates the digital intermediate frequency composite signal. For example, the composite signal of FIG. 2A may comprise a TMBOC or BOC signal that is outputted by the analog-to digital converter at node 2A in FIG. 1, inputted at the code correlator 14 at node 2A in FIG. 1, or both. FIG. 2A shows the modulating signal in its spread form provided by the multiplication of the first signal by the ranging code signal. The modulating signal is applied to the correlator 14 at node 2A in its spread form.

Figure 2B:
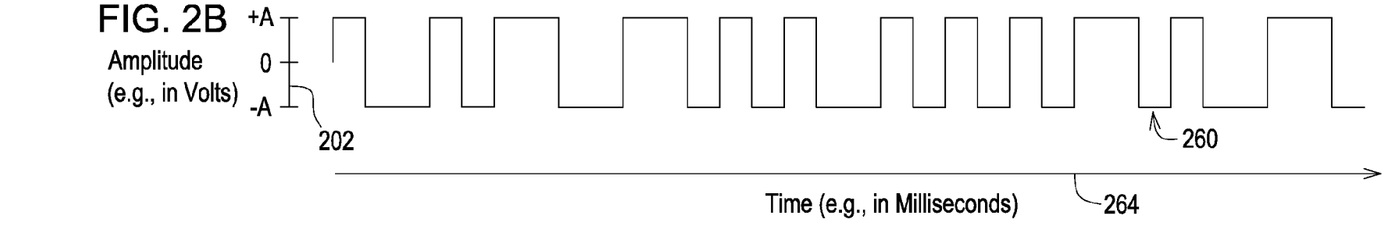
FIG. 2B is a diagram of an illustrative baseband representation of the locally generated reference signal.

The vertical axis 253 of FIG. 2A shows an amplitude of the signal (e.g., in Volts), whereas the common horizontal axis 264 of FIG. 2A and FIG. 2B show elapsed time (e.g., in milliseconds). As illustrated the composite signal may comprise a Manchester coded, square wave signal that varies between an amplitude of +A and −A. In an alternative embodiment, the composite signal may be encoded to have in-phase and anti-phase components.

In one configuration, the composite signal of FIG. 2A may be formed by a satellite transmitter that multiplexes a first binary offset carrier signal component (BOC (n,m) signal) and a second binary offset carrier signal component (BOC(o, p) signal), where n, m, o and p are integer values, m is $f_m/f_c$, n is $f_n/f_c$, $f_m$ is a first subcarrier frequency, $f_n$ is the actual chip frequency, and $f_c$ is the reference chip frequency, o is $f_o/f_c$, p is $f_p/f_c$, $f_o$ is a second subcarrier frequency, $f_p$ is the actual chip frequency and $f_c$ is the reference chip frequency, where the second binary offset carrier signal component has a higher frequency component than the first binary offset carrier signal component. The first binary offset carrier signal component (e.g., BOC(n,m)) is illustrated at reference numbers 250, whereas the second binary offset carrier signal component (e.g., BOC(o,p)) is illustrated at reference numbers 251.

FIG. 2B illustrates one possible representation of the locally generated reference signal that is at baseband or the same intermediate frequency as the output of the receiver front end 10. For example, the locally generated reference signal may comprise a signal that appears at the mixer output node 41 or at reference node 2B in FIG. 1. FIG. 2B shows the modulating signal in its spread form provided by the multiplication of the first signal by the ranging code signal. The modulating signal is applied to the correlator 14 at node 2B in its spread form to properly decode the received composite signal. The vertical axis 202 of FIG. 2B shows an amplitude of the signal (e.g., in Volts), whereas the common horizontal axis 264 of FIG. 2A and FIG. 2B show elapsed time (e.g., in milliseconds). As illustrated the composite signal may comprise a Manchester coded, square wave signal that varies between an amplitude of +A and −A.

As illustrated, the locally generated reference signal may be representative of a Manchester-coded, square wave signal that varies between an amplitude of +A and −A, consistent with the first signal output of the first signal generator 18. In one embodiment, all or a substantial majority of the time slots are associated with the first signal. The first binary offset carrier signal component (e.g., BOC(n,m)) is illustrated at reference numbers 260, whereas the second binary offset carrier signal component (e.g., BOC(o,p)) are not substantially present in the locally generated reference signal of FIG. 2B.

Figure 3:
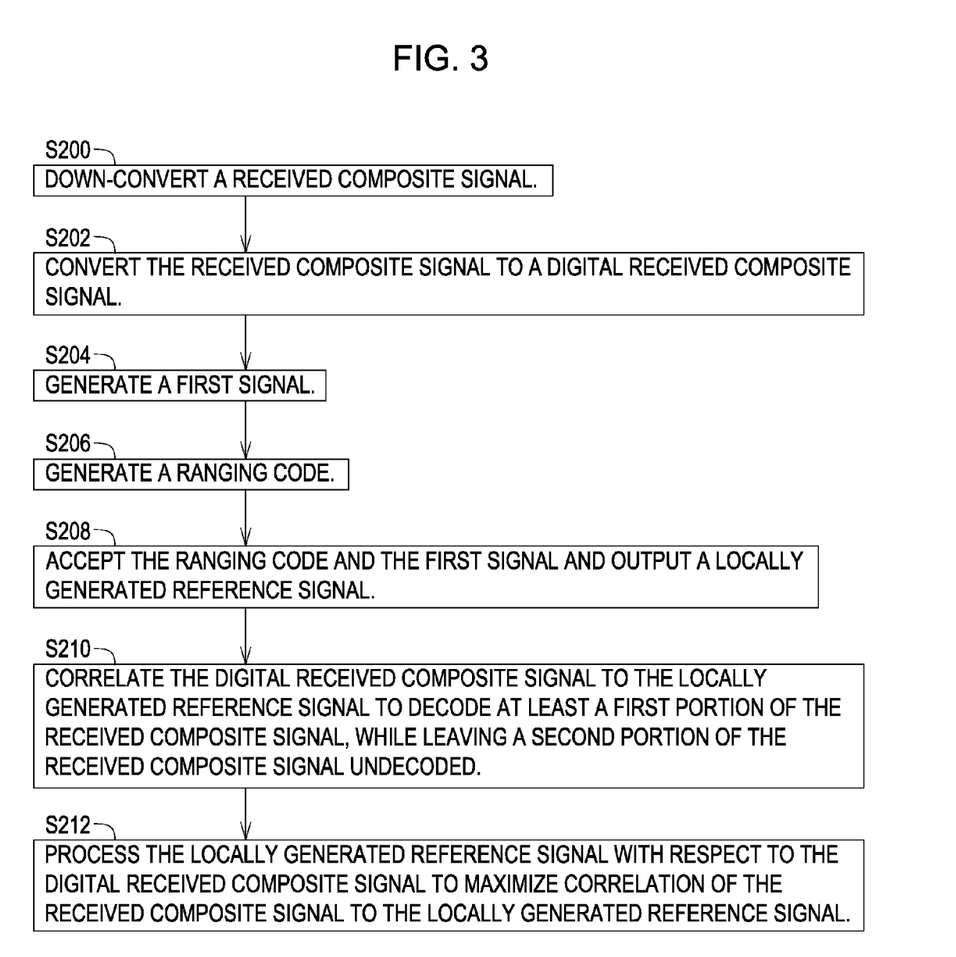
FIG. 3 is a flow chart of one embodiment of a method for receiving a composite signal (e.g., multiplexed binary offset carrier signal).

FIG. 3 illustrates one embodiment of a method for receiving a composite signal (e.g., binary offset carrier signal). The method of FIG. 3 begins in step S200.

In step S200, a receiver 11, receiver front end 10, or downconverter downconverts a received composite signal (e.g., multiplexed binary offset carrier signal). For example, the receiver front end 10 downconverts a received signal that is transmitted from a satellite (e.g., navigation satellite) to an intermediate frequency signal or a baseband signal.

In step S202, a receiver 11, an analog-to-digital converter 12 (ADC) or converter converts the down-converted composite signal to a digital received composite signal. For example, the analog-to-digital converter 12 converts the analog intermediate frequency signal to analog baseband signal outputted by the receiver front end 10 to a digital intermediate frequency signal or a digital baseband signal that can be processed in the digital domain (e.g., in the time domain via Fast Fourier transforms, Z-transforms or otherwise) by a data processor or data processing system 15.

In step S204, a receiver or first signal generator 18 generates a first signal (e.g., a square wave signal at a first frequency). The first signal means a first modulating signal or a first subcarrier signal, for example. Step S204 may be executed in accordance with various techniques that may be applied separately or cumulatively. Under a first technique, the first signal generates a first signal that is a precursor of a component of the received composite signal (e.g., multiplexed binary offset carrier signal). Under a second technique, if the received composite signal comprises a multiplexed binary offset carrier (MBOC) or a time multiplexed binary offset carrier (TMBOC) signal, then the first signal comprises a signal precursor of at least one binary offset carrier (BOC) signal component (e.g., BOC(1,1) signal) of the MBOC or TMBOC signal. Under a third technique, if the received composite signal comprises a multiplexed binary offset carrier (MBOC) signal composed of a binary offset carrier (BOC) (1,1) signal component and a BOC (6,1) signal component, then the first signal comprises a signal precursor of a BOC (1,1) signal. Under a fourth technique, the generating of the first signal comprises the generating of a first square wave signal at a first frequency (e.g., 1.023 MHz). Under a fifth technique, the generating of the first signal comprises the generating of a sinusoidal signal composed of a SinBOC (1,1) signal precursor.

In step S206, receiver 11 or the ranging code generator 32 generates a ranging code. For example, the ranging code may comprise a pseudo-random noise code, or a pseudo noise code at a chipping rate or chipping frequency. At the satellite transmitter that transmits the composite signal, the composite signal can be modulated with substantially the same ranging code, such that the receiver 11 can recover the pilot code modulation or any data (e.g., navigation code) modulated on the composite signal, or any carrier phase information that supports estimating a receiver position with respect to one or more satellites.

In step S208, a mixer 26 accepts the ranging code and the first signal and outputs a locally generated reference signal. For example, the mixer 26 multiplies the first signal with the ranging code to produce a spread, modulated signal as the locally generated reference signal. Step S208 may be executed in accordance with various examples that may be applied individually or cumulatively. In a first example for executing step S208, if the received composite signal comprises a multiplexed binary offset carrier (MBOC) signal composed of a binary offset carrier (BOC) (1,1) signal component and a BOC (6,1) signal component, then the locally generated reference signal comprises a BOC (1,1) signal.

In a second example, the locally generated reference signal comprises a binary offset carrier signal that is generated without the use of any time division multiplexer or any frequency division multiplexer. The elimination of a multiplexer is well suited for reducing power consumption of the receiver and making the receiver less complex.

In a third example for executing step S208, if the received composite signal comprises a multiplexed binary offset carrier (MBOC) signal, where a first portion of the received composite signal comprises a first binary offset carrier (BOC) (n,m) signal component and where a second portion of the received composite signal comprises a second binary offset carrier (BOC) (o,p) signal component, where n, m, o and p are integer values as already defined in this document, then the locally generated reference signal is associated with the first BOC (n,m) signal component that is temporally dominant in a majority of the time slots of the MBOC signal.

In step S210, a code correlator 14 correlates the digital received composite signal to the locally generated reference signal to decode at least a first portion of the received composite signal, while leaving a second portion of the received composite signal undecoded. Step S210 may be executed in accordance with various techniques that may be applied separately or cumulatively. Under a first technique, the code correlator 14 correlates the digital composite signal to the locally generated signal to demodulate the ranging code, the first signal, or both. Under a second technique, the code correlator 14 correlates the digital composite signal to the locally generated signal (e.g., to identify edge transitions) for tracking the carrier phase of the of the received composite signal.

In step S212, a tracking loop signal processor 16 processes the locally generated reference signal with respect to the digital received composite signal to maximize the correlation of the received composite signal to the locally generated reference signal. For example, the tracking loop signal processor 16 instructs the time delay module 22, shift register or phase shifter to adjust (e.g., dynamically) an adjustable time delay of the locally generated reference signal (or delayable signal derived therefrom) with respect to the digital received composite signal via a time delay module 22 to maximize correlation of the received composite signal to the locally generated reference signal.

In one embodiment, the receiver (e.g., 11) of a satellite navigation system, such as the Global Positioning System (GPS), may use an L1C signal that is modulated with a time multiplexed binary offset carrier TMBOC (6,1,4/33) Pilot component at an L1 carrier frequency (e.g., 1575.42 MHz). The composite signal may comprise the L1C signal. The L1C signal comprises two components, the Data component and the Pilot component. The Data component only contains a minority (e.g., approximately 25%) of the total power spectral density of the L1C signal while the Pilot component contains a majority (e.g., the remaining 75%) of the total power spectral density of the L1C signal.

The Data component is binary offset carrier BOC (1,1) signal modulated by a modulating signal that comprises CNAV data bits, where the modulating signal is multiplied by a data-component pseudo-noise (PN) code. Accordingly, the Data component is a BOC (1,1) signal modulated by message data (e.g., CNAV data bits) and a data-component PN code. CNAV data bits include information related to time, clock, status, ephemeris and almanac data related to one or more satellites of the navigation system. For example, an illustrative modulating signal can be formed by CNAV data bits that are modulo-2 added (or otherwise encoded) to an approximately 1 MHz (e.g., 1.023 MHz) square-wave signal or subcarrier, for example. The PN code of the Data component is a ranging code for formation of a binary offset carrier BOC(1, 1) signal at a subcarrier frequency of approximately 1 MHz (e.g., 1.023 MHz). The BOC(1,1) signal is derived from a general modulating signal multiplied by the ranging code or data-component PN code, where the general modulating signal is based on a Manchester encoded (e.g., sine Manchester encoded) square wave at approximately 1 MHz (e.g., 1.023) that is modulo-2 added to any message data (e.g., CNAV data bits). For example, the ranging code may be derived from a unique length sequence with a common expansion sequence of known length inserted at pseudo-random noise signal number dependent point, where the ranging code has a chipping rate (e.g., of approximately 1.023 MHz).

The Pilot component is not modulated by any data bits, but is modulated by a different PN code than the data-component PN code (e.g., a pilot-component PN code that is generally orthogonal to data-component PN code used for the Data component to avoid interference). The PN code of the Pilot component is a ranging code modulated (e.g., alternately modulated) by the TMBOC(6,1,4133) Manchester encoded square wave signal precursors at approximately 6 MHz (e.g., 6.138 MHz) and 1 MHz (e.g., 1.023 MHz).

Figure 4:
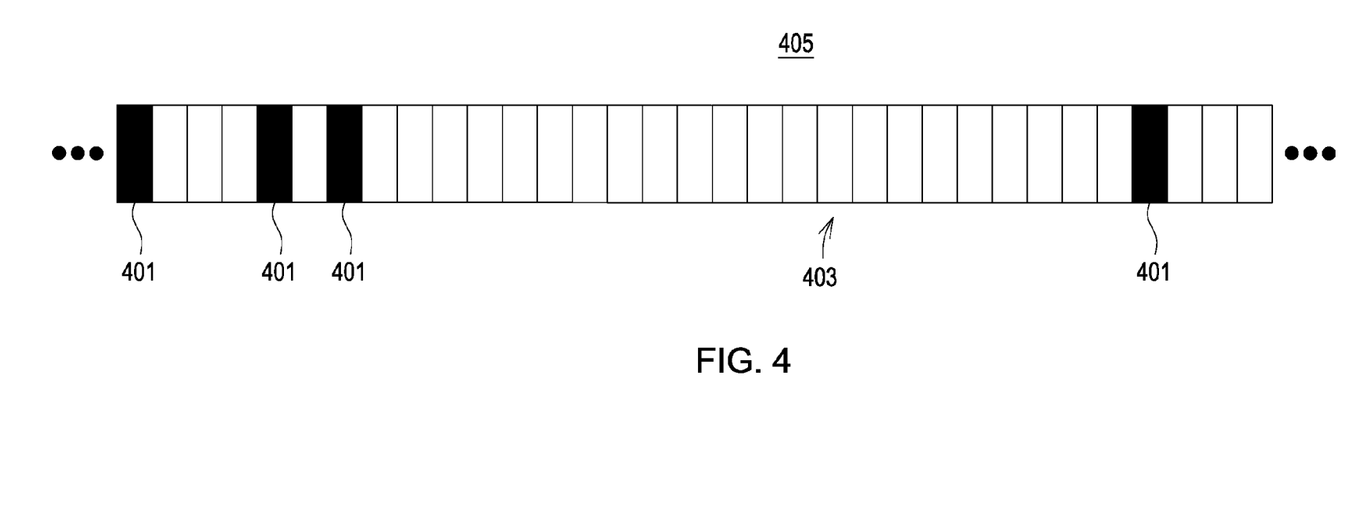
FIG. 4 provides an illustrative example of the modulation of the pilot component of a composite signal (e.g., L1C signal for a Global Positioning System).

FIG. 4 provides the timing data or a code sequence associated with a modulating signal 405 of a TMBOC signal in which 4 of 33 code chips are modulated by the 6.138 MHz BOC(6,1) Manchester-encoded square wave and the other 29 of 33 code chips are modulated by a 1.023 MHz BOC(1,1) Manchester-encoded square wave. The three dots before and after the blocks of the modulating signal 405 indicate that the modulating signal 405 is repetitive. In FIG. 4 the dark shaded blocks 401 represent the locations that contain the BOC(6,1) signal and the empty or light blocks 403 indicate the location of the BOC(1,1) signal. The ranging code may be derived from a unique length sequence with a common expansion sequence of known length inserted at pseudo-random noise signal number dependent point, where the ranging code has a chipping rate (e.g., of approximately 1.023 MHz).

For the locally generated reference signal, a complete replica of the TMBOC (e.g., TMBOC(6,1,4/33)) signal used to modulate the L1C Pilot component is required to demodulate the received signal without any degradation of the received signal-to-noise ratio of the received composite signal (e.g., L1C signal or the Pilot component of the L1C signal). If BOC(1,1) code chips are inserted in the place of the BOC(6,1) code chips in the locally generated reference signal where the received composite signal is a TMBOC signal, the receiver would demodulate the Pilot component faithfully but would experience some signal-to-noise ratio loss (e.g., approximately 1.1 dB of SNR loss) for the Pilot component. The specification of the L1C signal is defined in IS-GPS-800A, which is entitled "Global Positioning System Directorate Systems Engineering & Integration Interface Specification IS-GPS-800, Navstar GPS Space Segment/User Segment L1C Interface," publication IS-GPS-800B, dated 21 Sep. 2011, available on-line at http://www.gps.gov/technical/icwg/IS-GPS-800B.pdf which is hereby incorporated by reference.

The receiver and method described in this document is well suited for at least partially decoding the composite signal or the multiplexed binary offset signal with minimal or nominal loss of performance (e.g., signal-to-noise ratio) in comparison to certain prior art receivers that fully decode the composite signal or the multiplexed binary offset signal. For example, the receiver and method described in this document is well suited for using less circuitry by elimination or deletion of a time division multiplexer and supporting hardware (e.g., controller or data processor for controlling or selecting inputs of the time division multiplexer) and software. Accordingly, the receiver and method described in this document can potentially consume less energy and can be less expensive to manufacture than that required for decoding fully the composite signal or the multiplexed binary offset signal.

Having described the preferred embodiment, it will become apparent that various modifications can be made without departing from the scope of the invention as defined in the accompanying claims. For example, one or more of any dependent claims set forth in this document may be combined with any independent claim to form any combination of features set forth in the appended claims, and such combination of features in the claims are hereby incorporated by reference into the specification of this document.

The following is claimed:

1. A receiver for receiving a received composite signal, the receiver comprising:
   a receiver front-end for down-converting a received composite signal;
   an analog-to-digital converter for converting the received composite signal to a digital received composite signal;
   a first signal generator for generating a first signal;
   a ranging code generator for generating a ranging code;
   a mixer accepting the ranging code and the first signal and outputting a locally generated reference signal;
   a code correlator for correlating the digital received composite signal to the locally generated reference signal to decode at least a first portion on the received composite signal, while leaving a second portion of the received composite signal undecoded; and
   a tracking loop signal processor for processing the locally generated reference signal with respect to the digital received composite signal to maximize correlation of the received composite signal to the locally generated reference signal wherein the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where the locally generated reference signal is associated with the first BOC (n,m) signal component that is temporally dominant in a majority of the time slots of the MBOC signal.

2. The receiver according to claim 1 wherein the received composite signal comprises a multiplexed binary offset carrier (MBOC) or a time multiplexed binary offset carrier (TMBOC) signal and wherein the first signal comprises a signal precursor of the binary offset carrier (BOC) signal component of the MBOC or TMBOC signal.

3. The receiver according to claim 1 wherein the received composite signal comprises a multiplexed binary offset carrier (MBOC) signal composed of a binary offset carrier (BOC) (1,1) signal component, and a BOC (6,1) signal component, and wherein the first signal comprises a signal precursor of a BOC (1,1) signal.

4. The receiver according to claim 1 wherein the received composite signal comprises a multiplexed binary offset carrier (MBOC) signal composed of a binary offset carrier (BOC) (1,1) signal component, and a BOC (6,1) signal component, and wherein the locally generated reference signal comprises a BOC (1,1) signal.

5. The receiver according to claim 1 wherein the first signal generator comprises a first square wave generator for generating a first signal at a first frequency.

6. The receiver according to claim 1 wherein the first signal generator comprises a sinusoidal wave generator for generating a SinBOC (1,1) signal precursor.

7. The receiver according to claim 1 wherein the locally generated reference signal comprises a binary offset carrier signal that is generated without the use of a time division multiplexer.

8. The receiver according to claim 1 wherein the code correlator correlates the digital composite signal to the locally generated signal to demodulate the ranging code.

9. The receiver according to claim 1 wherein the code correlator correlates the digital composite signal to the locally generated signal to identify edge transitions for tracking the carrier phase of the of the received composite signal.

10. The receiver according to claim 1 further comprising:
a time delay module for shifting an adjustable time delay of the locally generated reference signal with respect to the digital received composite signal in response to the tracking loop signal processor based on maximizing correlation of the received composite signal to the locally generated reference signal.

11. A method for receiving a composite signal, the method comprising:
down-converting a received composite signal;
converting the received composite signal to a digital received composite signal;
generating a first signal;
generating a ranging code;
accepting the ranging code and the first signal and outputting a locally generated reference signal;
correlating the digital received composite signal to the locally generated reference signal to decode at least a first portion of the received composite signal, while leaving a second portion of the received composite signal undecoded; and
processing the locally generated reference signal with respect to the digital received composite signal to maximize correlation of the received composite signal to the locally generated reference signal wherein the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where the locally generated reference signal is associated with the first BOC (n,m) signal component that is temporally dominant in a majority of the time slots of the MBOC signal.

12. The method according to claim 11 wherein the received composite signal comprises a multiplexed binary offset carrier (MBOC) or a time multiplexed binary offset carrier (TM-BOC) signal and wherein the first signal comprises a signal precursor of the binary offset carrier (BOC) signal component of the MBOC or TMBOC signal.

13. The method according to claim 11 wherein the received composite signal comprises a multiplexed binary offset carrier (MBOC) signal composed of a binary offset carrier (BOC) (1,1) signal component, and a BOC (6,1) signal component, and wherein the first signal comprises a signal precursor of a BOC (1,1) signal.

14. The method according to claim 11 wherein the received composite signal comprises a multiplexed binary offset carrier (MBOC) signal composed of a binary offset carrier (BOC) (1,1) signal component, and a BOC (6,1) signal component, and wherein the locally generated reference signal comprises a BOC (1,1) signal.

15. The method according to claim 11 wherein the generating of the first signal comprises the generating of a first square wave signal at a first frequency.

16. The method according to claim 11 wherein the generating of the first signal comprises the generating of a sinusoidal signal composed of a SinBOC (1,1) signal precursor.

17. The method according to claim 11 wherein the locally generated reference signal comprises a binary offset carrier signal that is generated without the use of a time division multiplexer.

18. The method according to claim 11 wherein the correlating of the digital composite signal comprises correlating the digital composite signal to the locally generated signal to demodulate the ranging code.

19. The method according to claim 11 wherein the correlating comprises correlating the digital composite signal to the locally generated signal to identify edge transitions for tracking the carrier phase of the of the received composite signal.

20. The method according to claim 11 further comprising:
shifting an adjustable time delay of the locally generated reference signal with respect to the digital received composite signal in response to the tracking loop signal processor based on maximizing correlation of the received composite signal to the locally generated reference signal.

* * * * *